May 11, 1926.

C. W. WHITE

VEHICULAR BRAKE

Filed Sept. 30, 1921

1,583,907

Inventor
Clarence W. White
By His Attorney

Patented May 11, 1926.

1,583,907

UNITED STATES PATENT OFFICE.

CLARENCE WATSON WHITE, OF NORTH BENNINGTON, VERMONT.

VEHICULAR BRAKE.

Application filed September 30, 1921. Serial No. 504,323.

My invention relates to brakes for vehicles and more particularly to the so-called drum type of brake in which a circumferential constricting band is applied to a drum attached to the hub of a wheel of the vehicle to be affected thereby.

An object of my invention is to provide a device of the class described which is simple in construction and operation and at the same time effective in application to break the speed of the vehicle to which it pertains.

My brake may be employed with many types of vehicles and will be found especially adaptable to coasting devices such as are primarily designed for use by children where simplicity of construction and control is essential.

Figure 1:
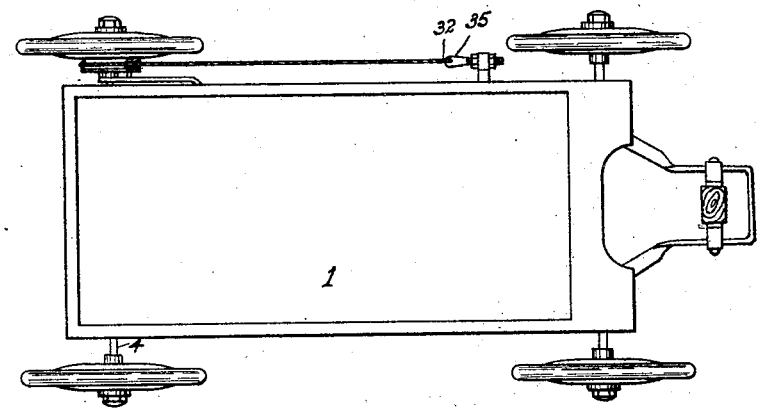
Figure 2:
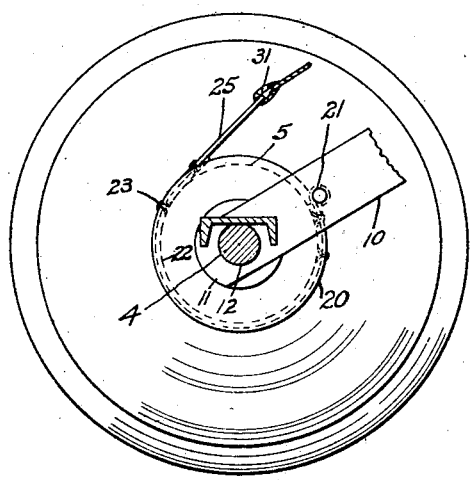
Figure 3:
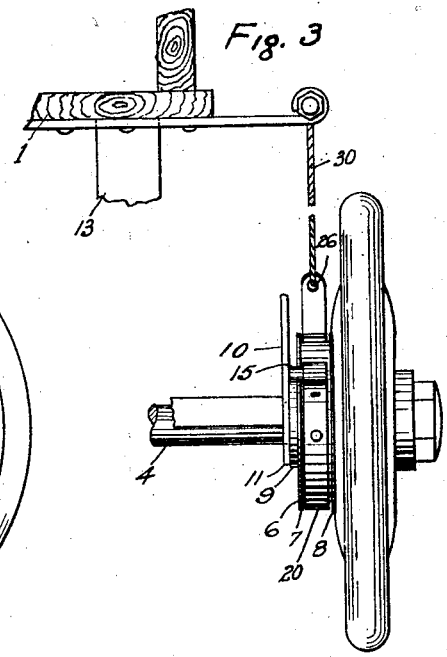

Having reference to the drawings illustrative of a preferred embodiment of my invention, Figure 1 is a plan view of a four wheeled coaster wagon equipped with a brake at one side thereof;

Fig. 2 is an inside elevation of the rear wheel to which the brake is attached; and Fig. 3 is a front end view of parts shown in Fig. 2.

Referring to the drawings, the numeral 1 represents the body of a child's vehicle having four wheels, two of which are mounted upon a swivelling axle, of which the detailed mechanism is not fully shown in the drawing; the other or rear wheels being rotatably mounted upon an axle 4 that is immovably attached to the body of the vehicle.

In the drawings a brake mechanism is illustrated in connection with the rear wheel at the left side of the wagon, and comprises a drum 5 which in the preferred form shown is made in the form of a hollow metal cylinder 5 having a face 6 that extends beyond the periphery of the drum to form a guide flange 7.

The drum 5 may be attached to the spokes or web of the wheel to which it pertains in any convenient manner. In the preferred form illustrated I employ the web type of wheel construction and the drum is brazed to the inner face of the wheel by means of an inner flange 8 rounded slightly to correspond with the contour of the portion of the web of the wheel to which it applies.

The face 6 of the drum is placed with its flange 7 outermost, the flange at one side and the web of the wheel at the other forming a guiding and retaining wall for the constricting band presently to be more fully described.

Upon the rear axle 4 adjacent the face 6 of the drum is a washer 9 interposed between the wheel and drum on one side thereof, and the lowermost end 11 of the brace 10 on the other side; the axle also supporting the brace through an orifice 12 suitably provided therein.

The brace bar 10 exteeds forwardly and upwardly and is attached at its upper end to a convenient portion of the bed 1 of the vehicle. This connecting bar in the particular form illustrated has been bent or twisted intermediate its ends so as to form a convenient bracket 13 at its upper end for permanent attachment by wood screws, bolts or other convenient means to the bottom surface of the body of the wagon.

Projecting laterally from the bar 10 which it has been seen is radially disposed relatively to the drum, is the shouldered stud 15 which extends over the drum 5 and which by riveting its head upon the inner face of the connecting bar forms a rigid supporting post for an end of the brake band 20. This brake element is preferably formed of a narrow strip of flat spring-tempered steel having at one end an eye 21 formed into which loosely fits the outer portion of the stud 15. The stud or post as illustrated in the drawings is shown in its simplest form having a straight body portion extending into the eye of the band or strap 20 loosely mounted thereon. Obviously this stud or post may conveniently be employed as the sole supporting and guiding means for the band either by rigidly connecting these two parts, or by providing a head and shoulder thereon at the respective ends of the eye or opening 21.

The band 20 is shaped so as to extend partially around the drum normally at a slightly greater diameter than that of the drum so as not to cause frictional contact therewith, the band being guided and kept in place laterally chiefly by the flanges 7 and 8.

The band 20 partially surrounding the drum is first carried downwardly, then back and under the drum, bending upwardly and forwardly and terminating in a tangential arm 25 which in the normal open position of the band extends upwardly at approximately 45° inclination, which arm it will readily be seen when drawn forwardly will cause the band to exert a constricting pressure upon the peripheral surface of the drum proportional to the force applied.

Thus it will be seen that in the form described the band when constricted is being drawn in the direction of the circumferential movement of the drum, as the vehicle moves in the forward direction, the latter motion aiding in the act of braking the wheel.

The means for attaining this action in the form illustrated, comprises a cable 30 preferably made of flexible wire which has a looped end 31 engaging an orifice 26 in the free end of the tangential arm 25 of the band. The other extremity of the cable 30 is similarly looped as at 32 to an eye bolt 35 fixed to the body 1 of the wagon to which it has been seen is also rigidly attached the axle carrying the wheel and drum and also connecting bar 10 upon which an end of the brake band is mounted.

Hence it will be seen that by the simple action of drawing the cable upwardly, or pressing it downwardly somewhat in the manner an archer would draw the string of his bow, the tangential arm 25 is impelled forwardly, thereby decreasing the operable diameter of the band 20 and applying in the process the frictional contact required to brake the wheel.

In the form of band 20 illustrated, I employ a metal band 20 with a flexible lining 22 preferably made of leather and secured thereto by the rivets 23 in the usual manner of constructing brakes of this character, but it is obvious that other materials could be substituted without dispensing with the essentials of my improved brake mechanism.

Similarly other means may obviously be substituted for the mechanism illustrated for constricting the brake band, such for example as the familiar hand or pedal lever when used with a link or connecting rod running back to the arm 25 of the band as shown.

Having described my invention, what I claim is:

1. A vehicle having a body, an axle, braces connecting the axle to the body, wheels on said axle, a brake drum connected for rotation with one of said wheels, a stud provided upon one of the braces so as to extend into the plane of the drum and outside of its periphery, a flexible brake band connected at one end to said stud and extending around at least a portion of the periphery of the drum, and a flexible device connecting the free end of the band to the body of the vehicle, whereby the rotation of the drum and wheel may be checked by flexing the flexible device to tighten the band upon the drum.

2. A vehicle having a body, wheels supporting said body, a brake drum connected for rotation with one of said wheels, a flexible brake band anchored at one end and extending around at least a portion of the periphery of the drum, and a flexible device connected at one end to the free end of the brake band, extending along a side of the vehicle body and anchored at its free end to said body, whereby an occupant of the body may readily reach and flex said flexible device to tighten the band upon the drum and check the rotation of said one of the wheels.

3. A vehicle having a body, wheels supporting said body, a brake device acting to control the rotation of one of said wheels, a flexible cable connected to said brake device for operating it when the cable is pulled, said cable extending along one side of the body and anchored at its free end to said body, whereby an occupant of the body may readily reach and flex said cable to create a pull thereon and through said pull cause an operation of the brake device.

In testimony whereof I have hereunto set my hand.

CLARENCE WATSON WHITE.